United States Patent
Hoteit et al.

(10) Patent No.: US 10,208,577 B2
(45) Date of Patent: Feb. 19, 2019

(54) METHOD FOR EFFICIENT DYNAMIC GRIDDING

(71) Applicant: Chevron U.S.A. Inc., San Ramon, CA (US)

(72) Inventors: Hussein Hoteit, Katy, TX (US); Adwait Chawathe, Sugar Land, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 622 days.

(21) Appl. No.: 14/049,877

(22) Filed: Oct. 9, 2013

(65) Prior Publication Data

US 2015/0100293 A1    Apr. 9, 2015

(51) Int. Cl.
| | | |
|---|---|---|
| *G06G 7/48* | (2006.01) |
| *E21B 43/16* | (2006.01) |
| *E21B 43/00* | (2006.01) |
| *G01V 99/00* | (2009.01) |
| *E21B 49/00* | (2006.01) |

(52) U.S. Cl.
CPC .............. *E21B 43/16* (2013.01); *E21B 43/00* (2013.01); *E21B 49/00* (2013.01); *G01V 99/005* (2013.01); *G01V 2210/66* (2013.01)

(58) Field of Classification Search
None
See application file for complete search history.

(56) References Cited

U.S. PATENT DOCUMENTS

| | | | | |
|---|---|---|---|---|
| 6,662,109 B2* | 12/2003 | Roggero | ............. | G01V 11/00 702/6 |
| 7,310,579 B2* | 12/2007 | Ricard | ............. | G01V 11/00 367/73 |
| 8,095,349 B2* | 1/2012 | Kelkar | ............. | E21B 47/06 703/10 |
| 8,301,429 B2* | 10/2012 | Hajibeygi | ............. | G06F 17/5018 702/127 |
| 2008/0167849 A1 | 7/2008 | Hales et al. | | |

(Continued)

FOREIGN PATENT DOCUMENTS

| | | |
|---|---|---|
| WO | 2011/097055 A2 | 8/2011 |
| WO | 2013/119906 A1 | 8/2013 |

OTHER PUBLICATIONS

Gerritsen, M., and J. V. Lambers. "Integration of local—global upscaling and grid adaptivity for simulation of subsurface flow in heterogeneous formations." Computational Geosciences 12.2 (2008): 193-208.*

(Continued)

*Primary Examiner* — Aniss Chad
*Assistant Examiner* — Nithya J. Moll

(57) ABSTRACT

A method, system and computer readable medium is presented for use in enhancing oil recovery in a subsurface reservoir comprising. The method, system and computer readable medium defines a plurality of grid levels on a geological model of a subsurface reservoir. Connectivities and transmissibilities are calculated between neighboring cells in the same grid and between connecting cells between different grid levels. Gas and/or fluid dynamics are simulated using dynamic grid refinement where the connectivities and transmissibilities are updated at each time step based on the previously calculated connectivities and transmissibilities.

16 Claims, 13 Drawing Sheets

(56) References Cited

U.S. PATENT DOCUMENTS

| | | | |
|---|---|---|---|
| 2009/0070086 A1* | 3/2009 | Le Ravalec | G01V 1/30 703/10 |
| 2009/0254324 A1 | 10/2009 | Morton et al. | |
| 2009/0299714 A1 | 12/2009 | Kelkar et al. | |
| 2010/0057413 A1 | 3/2010 | Lee et al. | |
| 2010/0094597 A1* | 4/2010 | Blain | G06T 17/20 703/1 |
| 2010/0138196 A1 | 6/2010 | Hui et al. | |
| 2010/0138202 A1 | 6/2010 | Mallison et al. | |
| 2011/0246161 A1* | 10/2011 | Morton | E21B 49/00 703/9 |
| 2012/0158378 A1* | 6/2012 | Enchery | G01V 11/00 703/2 |
| 2012/0158380 A1* | 6/2012 | Hajibeygi | E21B 43/26 703/2 |
| 2012/0179443 A1 | 7/2012 | Van Batenburg et al. | |
| 2012/0232859 A1* | 9/2012 | Pomerantz | G01V 99/005 703/2 |
| 2013/0226540 A1* | 8/2013 | Pita | G06F 17/5009 703/2 |

OTHER PUBLICATIONS

Hegre, T. M., V. Dalen, and A. Henriquez. "Generalized transmissibilities for distorted grids in reservoir simulation." SPE Annual Technical Conference and Exhibition. Society of Petroleum Engineers, 1986.*

Lacroix, S., et al.; "Enhanced Numerical Simulations of IOR Processes Through Dynamic Sub-Gridding"; Canadian International Petroleum Conference 2003, Paper 2003-087, pp. 1-15.

Lavie, G., et al.; "An Evaluation of Criteria for Dynamic Gridding during Reservoir Simulation of Water Flooding and Solvent Injection"; 2011, SPE 141796, pp. 1-9.

Miller, K., et al.; "Moving Finite Elements. I"; SIAM J. Numer. Anal., Dec. 1981, vol. 18, No. 6, pp. 1019-1032.

Portella, Ricardo C. M., et al.; "Upscaling, Gridding, and Simulation Using Streamtubes"; 1998, SPE 49071, pp. 361-371.

Quandalle, Philippe, et al; "The Use of Flexible Gridding for Improved Reservoir"; 1983, SPE 12239, pp. 51-56 (with attached Table 3).

Rheinboldt, Werner C.; "On a Theory of Mesh-Refinement Processes"; SIAM J. Numer. Anal., vol. 17, Dec. 1980, pp. 766-778.

Sammon, Peter H. et al.; "Dynamic Grid Refinement and Amalgamation for Compositional Simulation"; 2003, SPE 79683, pp. 1-11.

Suicmez, V.S., et al.; "Dynamic Local Grid Refinement for Multiple Contact Miscible Gas Injection"; 2011, IPTC 15017, pp. 1-16.

van Batenburg, D.W., et al.; "Application of Dynamic Gridding Techniques to IOR/EOR-Processes"; 2011, SPE 14177, pp. 1-16.

von Rosenberg, Dale U., et al.; "Local Mesh Refinement for Finite Difference Methods"; 1982, SPE 10974, pp. 1-4 (with attached Tables I, III, ).

Wen, Xian-Huan, et al.; "Efficient 3D Implementation of Local-Global Upscaling for Reservoir Simulation"; Dec. 2006, SPE Journal, pp. 443-453.

Alpak, Faruk O., et al.; "A Multiscale Adaptive Local-Global Method for Modeling Flow in Stratigraphically Complex Reservoirs"; Dec. 2012 SPE Journal; pp. 1056-1070.

Christensen, J.R., et al.; "Applications for Dynamic Gridding to Thermal Simulation"; 2004, SPE 86969, pp. 1-10.

Christie, M.A., et al.; "Tenth SPE Comparative Solution Project: A Comparison of Upscaling Techniques"; 2001, SPE 66599, pp. 1-13.

Christie, M.A., et al.; "Upscaling for Reservoir Simulation"; Nov. 1996, Distinguished Author Series, pp. 1004-1010.

Ding, Yu, et al; "Development of Dynamic Local Grid Refinement in Reservoir Simulation"; 1993, SPE 25279, pp. 501-510.

Durlofsky, L.J., et al.; "Scale Up of Heterogeneous Three Dimensional Reservoir Descriptions"; Sep. 1996; SPE 30709, pp. 313-326.

Ewing, R.E., et al.; "Adaptive Local Grid Refinement"; 1988, SPE 17806, pp. 643-651.

Fincham, A.E., et al.; "Up-Gridding from Geological Model to Simulation Model: Review, Applications, and Limitations"; 2004, SPE 90921, pp. 1-10.

Han, D.K., et al."; A More Flexible Approach of Dynamic Local Grid Refinement for Reservoir Modeling"; 1987, SPE 16014, pp. 243-252.

Heinemann, Z.E., et al.; "Using Local Grid Refinement in a Multiple-Application Reservoir Simulator"; 1983, SPE 12255, pp. 205-214 (with attached Table 2).

Hoteit, Hussein, et al; "Making Field-Scale Chemical EOR Simulations a Practical Reality Using Dynamic Gridding;" 2014, SPE 169688, pp. 1-22.

Extended European Search Report, dated May 13, 2016, during the prosecution of European Application No. 14188151.6.

* cited by examiner

METHOD FOR EFFICIENT DYNAMIC GRIDDING

TECHNICAL FIELD

The present disclosure generally relates to a method, system, and computer readable medium for efficiently implementing dynamic gridding. In particular cases, the present disclosure describes a method of pre-computing transmissibility and connectivity, and methods to efficiently look-up transmissibilities and connectivities.

BACKGROUND

Many enhanced oil recovery (EOR) processes such as chemical, miscible and steam flooding are associated with complex flow mechanisms that manifest at the displacement front. Viscous fingering, polymer dilution and thermal effects are some of these mechanisms. Accurate modeling requires simulations on high resolution grids to properly capture the physics in the vicinity of the displacement front. The grid resolution in some applications needs to be at scales much smaller than typical grid resolutions (for example, 10-30 ft. vs. 100 ft.) used in modeling primary and secondary recovery processes. However, fine grid resolutions incur longer simulation times. Thus, past efforts at running full-field chemical EOR and thermal simulations were frequently deemed impractical resulting in limited use of reservoir simulation as a reliable tool for EOR reservoir management.

Parallel computing is the most common approach used to run high resolution models. This approach, however, is not practical in workflows that require simulations on many models to better manage uncertainties. Furthermore, access to massively parallel machines, which are required for full field simulations, is usually limited. Dynamic gridding is another approach that has been used to solve this problem. This approach modifies the grid resolution as needed during run time. The existing dynamic gridding approaches have challenges, such as efficiently managing the computational overhead to modify the grid resolution at run time and adequately capturing the appropriate level of heterogeneity in the modified cells.

Dynamic gridding has been implemented in the past with limited success due to the intensive computational requirements and therefore, past efforts for running full-field chemical EOR and thermal simulations were frequently deemed impractical resulting in limited use of reservoir simulation as a reliable tool for EOR reservoir management. Embodiments of the disclosure include new, more efficient methods to implement dynamic gridding.

SUMMARY

Embodiments of the disclosure include a method, system, and computer readable medium to enhance oil recovery in subsurface reservoirs. A general embodiment is a method for enhancing oil recovery in a subsurface reservoir comprising: receiving a geological model of a subsurface reservoir; defining a first level of a grid having a first plurality of cells; defining a second level of the grid having a second plurality of cells, wherein the first and second plurality of cells are different; calculating connectivities of neighboring cells in the same level grid from the geological model, and calculating connectivities of connecting cells between the first and second levels of the grid from the geological model; calculating grid transmissibilities between neighboring cells in the same grid level from the geological model, and calculating connectivities of connecting cells between the first and second level of the grid from the geological model; and simulating a fluid and/or gas flowing in the reservoir using dynamic grid refinement, wherein the connectivities and transmissibilities are updated at each time step based on the calculated connectivities and transmissibilities.

Another general embodiment of the disclosure is a non-transitory computer useable storage medium to store a computer readable program, wherein the computer readable program, when executed on a computer, causes the computer to perform the steps comprising: (receiving a geological model of a subsurface reservoir; defining a first level of a grid having a first plurality of cells; defining a second level of the grid having a second plurality of cells, wherein the second first and second plurality of cells are different; calculating connectivities of neighboring cells in the same level grid from the geological model, and calculating connectivities of connecting cells between the first and second level of the grid from the geological model; calculating grid transmissibilities between neighboring cells in the same grid level from the geological model, and calculating connectivities of connecting cells between the first and second level of the grid from the geological model; and simulating a fluid and/or gas flowing in the reservoir using dynamic grid refinement, wherein the connectivities and transmissibilities are updated based on the calculated connectivities and transmissibilities.

A further general embodiment is a system for enhancing oil recovery in a subsurface reservoir, the system comprising: a processor; and a memory storing computer executable instructions that when executed by the processor cause the processor to: (receive a geological model of a subsurface reservoir; define a first level of a grid having a first plurality of cells; define a second level of the grid having a second plurality of cells, wherein the second first and second plurality of cells are different; calculate connectivities of neighboring cells in the same level grid from the geological model, and calculate connectivities of connecting cells between the first and second level of the grid from the geological model; calculate grid transmissibilities between neighboring cells in the same grid level from the geological model, and calculate connectivities of connecting cells between the first and second level of the grid from the geological model; and simulate a fluid and/or gas flowing in the reservoir using dynamic grid refinement, wherein the connectivities and transmissibilities are updated based on the calculated connectivities and transmissibilities.

The reservoir related input can comprise one or more of initial grid sizes, number of grid refinement levels, rock model data, heterogeneity data for one or more refinement levels, size of grid, displacement fluid and/or gas fronts to be tracked, thresholds, time step length, and total time. The method can also include additional levels of grid refinement. For example, the grid refinement could include 2 total levels, 3 total levels, or 4 total levels. When more than two levels are used, connecting cell connectivities and transmissibilities can be calculated between all grid levels. For example, in a two level simulation the connectivities and transmissibilities can be calculated for connecting cells between the zeroth level and the first level, and between the first level and the second level. The grid may be represented by a Cartesian, perpendicular bisector, or corner-point-geometry grid. Each cell may be assigned multiple parameters, including for example, one or more of porosity, permeability, saturation, composition and pressure. Methods using pre-computation of connectivities and transmissibilities have resulted simulations with increased speeds of 30-150% in comparison to standard dynamic gridding simulations, and as such, such increased speeds may be obtained with embodiments of the disclosure. Additionally, a cell from the first level of the grid can have different rock properties from the related cell/cells of the second level of the grid. The simulated fluid and/or gas can comprise one or more of water, a surfactant, $CO_2$, steam, and polymer. In embodiments of the disclosure, simulating the fluid and/or gas includes simulating sequential injection of different types of fluid and/or gas into the reservoir. In some embodiments, the finer of the two or more grid levels is used at intersections between different types of fluid and/or gas. In some embodiments, the grid cells which are active when simulating a fluid and/or gas flowing in the reservoir can be consecutively numbered. The method, system or computer readable medium can further comprise predicting production rates of one or more of oil, gas, and water. Additionally, the method, system and computer readable medium can further comprise tracking one or more gas or liquid fronts, and tracking the front can comprise tracking saturation and/or composition, for example.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2A is the grid at multiple levels of refinement, FIG. 2B is the grid all at refinement level zero, FIG. 2C is the grid all at refinement level one, and FIG. 2D is the grid all at refinement level two.

DETAILED DESCRIPTION

Figure 1:
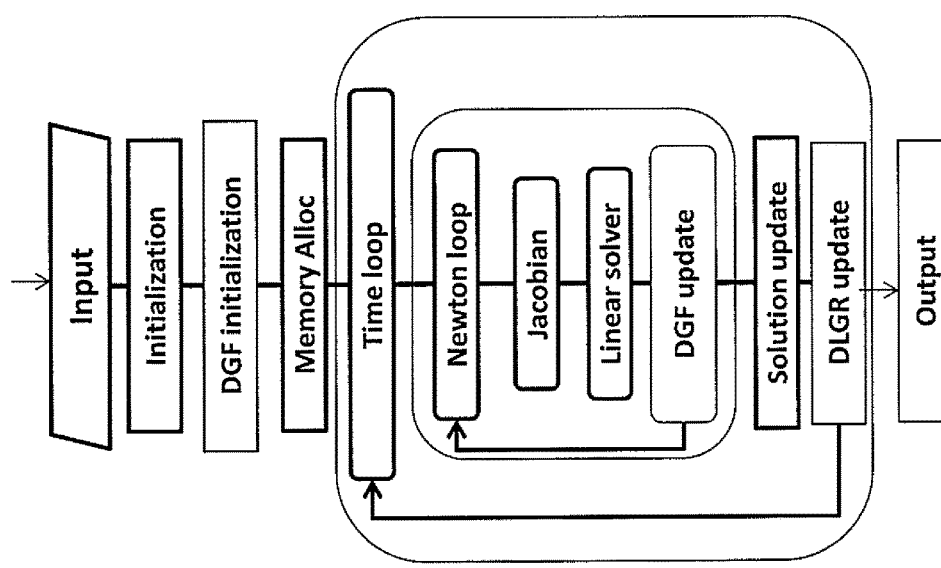
FIG. 1 is an example work flow chart.

Embodiments of the disclosure include a new efficient Dynamic Gridding Functionality (DGF) to be used in reservoir simulations for chemical EOR, thermal recovery and/or any other recovery process that requires computations on high resolution grids. Embodiments of this approach can use inexpensive memory to store large blocks of relevant grid information, instead of computing it at run time, which significantly improves the process efficiency. For example, run-time overhead is reduced by computing and storing grid cell connectivity and transmissibilities for prescribed coarse and fine grid templates in a pre-processing step. Additionally, each coarse or fine template maintains its level of heterogeneity by retaining its own cell properties. All these heavily CPU-time consuming computations, which were previously done at runtime, are now avoided, resulting in more efficiency. Features include one or more of the following:

a. The dynamic gridding method can track the location of the displacement front by calculating the first and second order spatial and temporal gradients of the displacing fluid properties such as saturations, concentrations, and temperature.

b. Grid resolution can be increased by refining the grid cells in the neighborhood of the displacement front.

c. Grid resolution can be decreased by coarsening the grid cells away from the displacement front.

d. Grid connectivity that describes the connections between each cell in the coarse grid and its neighboring cells are calculated and stored in memory in a pre-processing step before the real-time simulation begins. The stored data include all possible scenarios (based on prescribed templates) for a cell in the coarse grid in contact with other cells with different refinement levels.

e. Cell to cell transmissibilities in the coarse grid, in the refined grid, and those connecting the grids with different refinement levels are computed and stored (in memory, for example) before the real-time simulation begins. During the real-time simulation, only the required transmissibilities are checked out from the pre-computed and stored transmissibilities.

f. The method allows preserving the heterogeneity in rock properties such as permeability and porosity for all grid refinement levels. Therefore, the refined cells can have different rock properties from equivalently positioned cells in the coarse grid cells.

Testing on the methods described has resulted in increased speeds of 2-6 times in comparison to the static models. The methods also have been found to have increased speeds of 30-50% in comparison to standard methods of dynamic gridding which do not include precalculation of transmissibilities and connectivity. Additionally, the methods disclosed result in less error as calculations are essentially performed using the fine grid properties and therefore do not require up-scaling or down-scaling the fine and coarse grid properties (rock permeability and transmissibilities) during the simulation runtime. Property up-scaling from fine to coarse grids and down-scaling from coarse to fine grids is often associated with errors. Different upscaling techniques can be found in the following references: Christie and Blunt, 2001; Christie, 1996; and Durlofsky et al, 1996, incorporated herein by reference.

Work Flow

Embodiments of the disclosed methods aim to improve the accuracy of the numerical solution and reduce the computational CPU time when simulating various thermal and IOR/EOR recovery schemes in hydrocarbon reservoirs. The mathematical model is based on conventional governing equations that describe multiphase fluid flow and energy balance in porous media in the subsurface. The mathematical equations are solved with the conventional Finite Difference (FD) method, which is used in most commercial reservoir simulators. A detailed description of the FD method can be found, for example, in "K. Aziz and A. Settari. Petroleum Reservoir Simulation. Applied Science Publishers, 1979," incorporated herein by reference.

With the FD method, the geometry of the reservoir is partitioned into a grid in 1D, 2D, or 3D space. The geometry of the grid cells can vary. Commonly used cell types in full field simulations are Cartesian, perpendicular bisector (PEBI), and corner-point-geometry grids. Static properties (porosity and permeability, for example) and dynamic properties (saturations and pressure, for example) are assigned to each cell in the grid. The numerical procedure solves the governing equations and computes the fluid flow at various times by updating the dynamic properties in the grid cells. The accuracy of the predicted solution depends on the size of the grid cells. In some complex recovery schemes that involve sharp displacement fronts, (heat and gas fronts in thermal and gas injection schemes, for example), complex fluid reaction and phase mixing (chemical EOR and miscible flooding, for example), and complex rock heterogeneity (thief stratigraphic layers and fractures, for example), the calculation error could be significant if the grid-cell size is not small enough. The error is related to the introduced numerical dispersion, the instantaneous local equilibrium assumption in the FD method, and the rock properties up-scaling. Refining the grid by reducing the grid-cell size can improve the solution accuracy. However, this common approach increases the number of active grid cells in the simulation model, and therefore results in additional computer resource requirements.

Dynamic gridding aims to adjust the grid resolution in terms of grid cells size. This technique refines the grid locally to improve the solution accuracy in the vicinity of sharp displacement fronts and coarsens the grid in location slow flow activity. The major challenges associated with dynamic gridding are related to the computational overhead and the geological heterogeneity.

Embodiments of this disclosure introduce new methods, procedures, and systems to address dynamic gridding challenges, which include: gridding strategy, data structure, transmissibility calculation, connectivity, geological property upscaling, and geological structure.

An example workflow is given in FIG. 1. First, input is received which can include data such as initial grid size, number of grid refinement levels, rock model and heterogeneity information for one or more refinement level. Input also can include user supplied inputs such as grid levels, displacement fluid fronts to be tracked, thresholds to control the refinement frequency and density, initial time step length, and total simulation time. Within the method, variables and data structures are initialized, values are calculated and memory is allocated. For example, the dynamic grid functionality (DGF) values are initialized and precalculated. The DGF precalculation includes calculating all transmissibilities and connectivities between connecting cells in the same and different grid levels, which is described in more detail later in this disclosure. Precalculated transmissibilities and connectivities are stored in memory or on other computer readable medium. At this point a larger "Time Loop" is entered which includes a "Newton Loop." The Newton Loop contains a Jacobian linear solver which is used to iteratively solve for Newtonian fluid dynamics. Once the Jacobian converges (by reaching a predetermined threshold, for example), the Newton Loop is exited and the solution and DGF values are updated. The maximum number of DGF update (Nmax) within the Newton Loop as shown in FIG. 1. is optional and can be controlled by the user. If the number of DGF updates is entered as zero (Nmax=0), then the only DGF update will be after the convergence of the Newton Loop. If Nmax=1, for example, DGF update will only occur at the first Newton iteration and therefore the DGF updates will be skipped if more Newton iterations are needed. This technique helps to reduce the number of Newton iterations.

The DGF update includes, for example, refining and coarsening criteria (gradients and thresholds, for example), updating the grid (active blocks, connectivities, for example), updating transmissibilities, updating all dynamic variables (solutions, Jacobian, solver variables, for example), etc. The Newton Loop is then iterated through for each time step in the Time Loop. When the allotted number of time steps has been looped through, or through other user input exit criteria, the Time Loop is exited. The solution is then output. Examples of output include, output of the simulation to a computer monitor, output to a computer readable medium, or output to a printer. Computer readable medium includes hard drives, solid state drives, flash drives, memory, CD, DVD, or any computer readable medium that is non-transitory. Additionally, the output from the dynamically gridded simulation can be compared to the output from a fully refined grid simulation.

Gridding Strategy

Figure 2B:
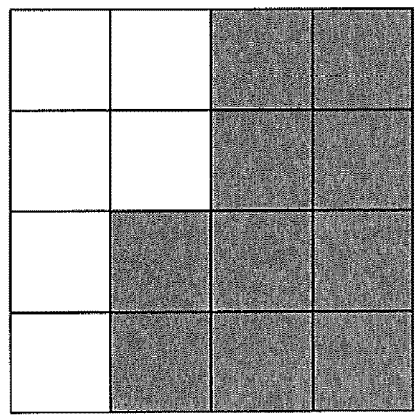
FIGS. 2A-D are examples of a three-level grid refinement.
Figure 2D:
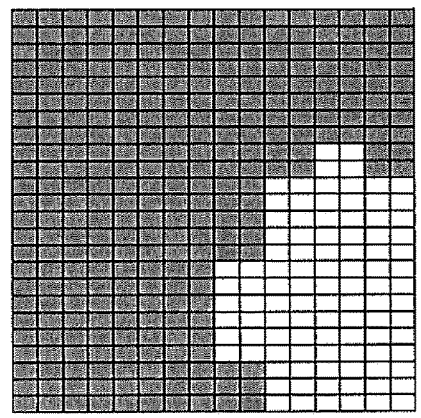
Figure 2A:
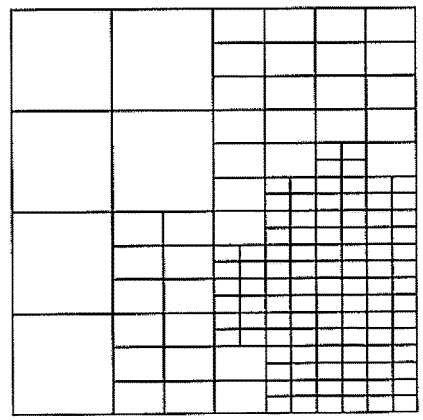
Figure 2C:
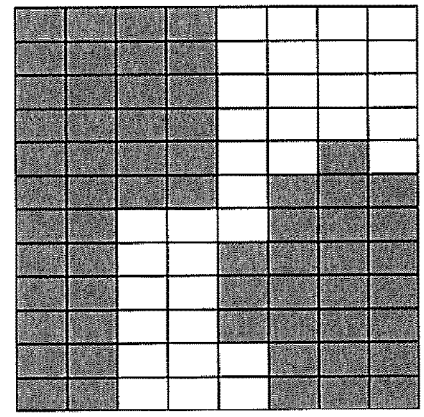

The grid can consist of regular or irregular grid-cells. The irregular cells are described by eight corner-points (i.e., corner-point-geometry) and the regular cells are described by Cartesian-type logically rectangular cells, for example. Embodiments of the gridding strategy support multi-level refinements. In the following example, for a grid with N levels of refinements—grid 0 is denoted as the parent (coarse) grid and grid i, i=1, . . . , N, the refined grids with ith level of refinement. The example case shown in FIG. 2A is a 2-level refined grid. Each refinement level, i.e. grid i, i=0, 1, . . . , N is regarded as independent grid that can have its own properties. These grids are overlapped and coupled to compose the originally refined grid. Unneeded grid cells are seen as inactive cells. FIGS. 2B, 2C, and 2D represent the grids 0, 1, and 2, respectively, composing the three-level refined grid shown in FIG. 2A. The shadowed grid cells are inactive. Mapping between the different grid refinement levels is explained later.

Data Structure

Dynamic gridding involves adding and deleting grid-cells at run time. The number of active cells and their locations vary. Memory allocation and de-allocation can be computationally expensive during run time as the number of active cells varies. To reduce computational overhead, memory allocation is done once at the initialization step. The extended allocated memory, which can be controlled by the user, is estimated from the maximum percentage of potentially refined cells in the grid.

The common approach in FD simulators which do not use dynamic gridding is to number the grid-cells in a consecutive order (i.e., natural numbering). However, FIG. 3a illustrates an example embodiment of the disclosure which uses consecutive numbering logic for a 3×3 grid in 2D space. With dynamic gridding, cells can be added and deleted at the run time. Deleted cells should be removed from the data structure (i.e., memory) and therefore only active cells are accounted for. However, in an embodiment of the disclosure, the cell numbering logic maintains a consecutive numbering for all active cells and avoids excessive memory swapping when adding or deleting cells.

Figure 3:
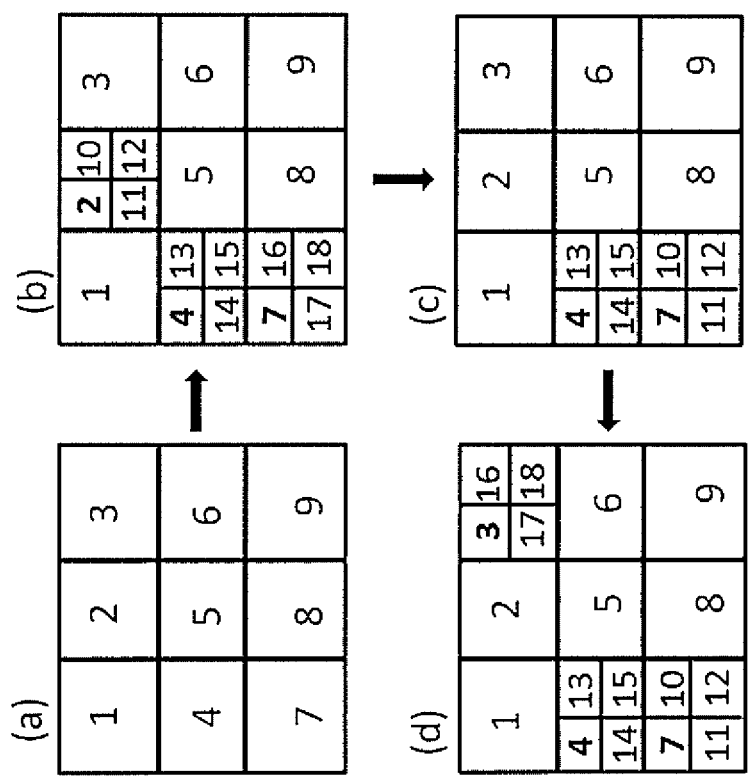
FIG. 3 is an example to illustrate the logic for numbering active cells.

An example procedure is outlined as follows:
1—Refining: When refining a cell, the cell (i.e., parent-cell) becomes inactive and the new cells (i.e., child-cells) corresponding to the parent-cell are added to the data structure. Denote by k the index of a parent-cell and by NB the total number of active cells in the grid at a given time. When refining the parent cell, one of the child-cells (say first cell) will take the index k and the others will be numbered in a consecutive order starting with the index NB+1. This numbering strategy avoids renumbering of the other unrefined cells. FIG. 3 shows a simple example to illustrate the numbering logic. The starting grid is shown in FIG. 3a. Three cells 2, 4, and 7 are then refined. FIG. 3b shows the re-numbering for all cells. If we consider cell 2, for example, the first child-cell took the index of its parent cell, i.e. 2, and the others are numbered consecutively starting from NB+1, i.e., 10, 11, and 12. The same logic is applied to number the refinements in cells 4 and 7. Note that no change in numbering is needed for the unrefined cells. Therefore, with this logic, no memory swapping or index update is needed for the unrefined cells.
2—Coarsening: When un-refining a grid, the parent-cell will retake its original index from the first child-cell and the other child-cells will be deactivated. Let NC be the number of the deactivated child-cells. To maintain a consecutive grid numbering without excessive grid renumbering, only the last NC cells in the grid will be renumbered with the same indices as the deactivated child-cells. This logic is illustrated in FIG. 3c. In FIG. 3c, the parent-cell 2 is un-refined. The cell retakes is original index 2. Because the cells 10, 11, and 12 are no more active, the last 3 cells in the grid, i.e., 16, 17, and 18 (see FIG. 3b) will be renumbered to 10, 11, and 12, respectively. Note that no change in numbering is needed for the other cells.

The numbering logic described above covers all possible situations when cells get refined and coarsened. FIG. 3d shows another illustrative case when a new cell gets refined (cell 3). This numbering logic avoids excessive grid re-numbering and therefore minimizes memory swapping. It can be applied in 1D, 2D, and 3D space with different number of refinement levels.

Transmissibility Calculation

Grid cell transmissibilities, which describe cell to cell flow connectivity, are calculated in terms of permeability and cell geometry. In a dynamic grid, transmissibilities and cell-to-cell connectivities vary. Transmissibility recalculation on the fly as the grid changes tends to result in significant computational overhead. In embodiments of the disclosure, a new procedure is introduced to calculate transmissibilities only once in the initialization step and reuse them as needed at the run time. Therefore, the transmissibilities usage workflow for dynamic gridding is kept the same as the one for conventional static grids. The idea is to store (in a database, for example) all potential connectivities and transmissibilities that could be encountered during the dynamic gridding runs. As the grid refinement varies, grid connectivities are determined and the corresponding transmissibilities are picked up from the database.

Figure 4:
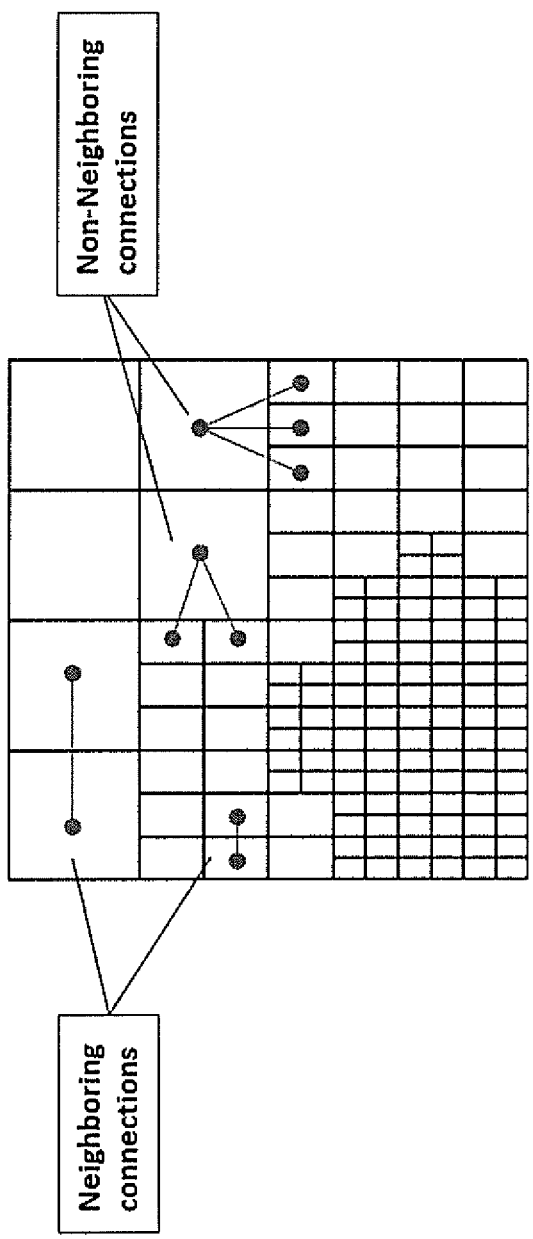
FIG. 4 illustrates neighboring and non-neighboring connections in a 3-level grid.
Figure 5:
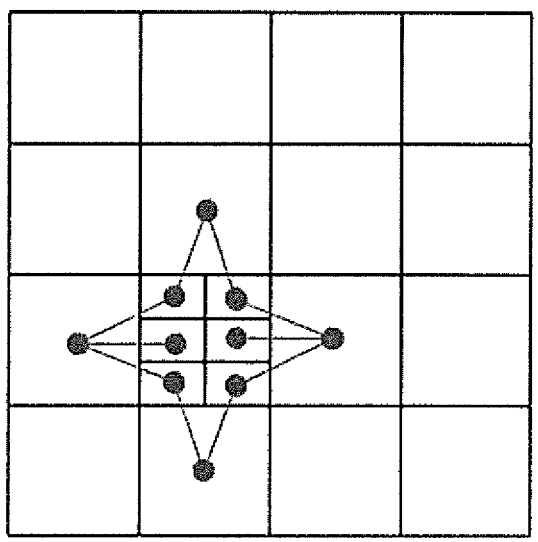
FIG. 5 shows grid 0 to grid 1 connectivities for cells 1 and 6 from FIG. 4.
Figure 5:
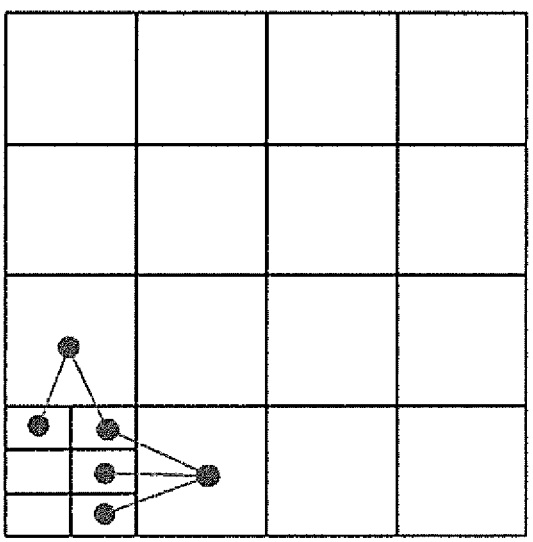

An example of the procedure is detailed as follows:

There are two types of connectivities/transmissibilities that could be encountered in a dynamic grid with N levels of refinements. Transmissibility calculation procedure is therefore performed accordingly as follows:
1—Neighboring transmissibility calculation: These transmissibilities correspond to neighboring-cell connections that occur within the same grid level, that is, grid i to grid i connections for i=0, . . . , N. FIG. 4 shows some of the neighboring connection in a 3-level grid. As discussed in the gridding strategy section, the multi-level refinements are seen as independent grids i, i=0, 1, . . . , N (see FIGS. 2a-d). The transmissibilities for all the grids i, i=0, 1, . . . , N are calculated and stored in a database in the memory. At any run time, all the neighboring transmissibilities are available for any refinement scenario.
2—Non-neighboring transmissibility calculation: These transmissibilities correspond to non-neighboring-cell connections that occur across grid levels, that is, grid i−1 to grid i for i=1, . . . , N. Note that in this case, the procedure does not let grids with more than two refinement levels to connect, that is, grid i−1 and grid i+1, for example. FIG. 4 shows some of the non-neighboring connection in a 2-level grid. The key idea here is to calculate and store all potential non-neighboring transmissibilities that could be encountered during the run time. Therefore, all potential connections between grid i−1 and grid i, i=1, . . . , N are identified. To simplify explaining the discussion, consider the two grid levels 0 and 1. Starting by the first cell in grid 0, it is refined (i.e., becomes level 1) and then all non-neighboring transmissibilities in all directions are determined. The logic is repeated for all other cells but always refining one cell at a time. FIG. 5 shows grid 0 to grid 1 connectivities for cells 1 and 6. This procedure is applied to cover all connectivities between grid i−1 and grid i, i=1, . . . , N. Note that "non-neighboring" is the standard term for connecting cells between grid levels in this type of simulation. In this disclosure "non-neighboring" is used to mean cells which border each other between different grid levels. "Non-neighboring" cells are also referred to as connecting cells between levels.

With this procedure, all transmissibilities in the dynamically refined grid that could be in 1D, 2D or 3D space are calculated and stored in the database, for example.

Connectivities

To improve CPU time efficiency, one embodiment is a fast method to locate and pick up transmissibility from storage (a database or table, for example) at run time. This includes identifying all cell-to-cell connectivities. To more efficiently locate the transmissibilities, an embodiment of the disclosure is a procedure to store all non-neighboring transmissibilities for grid i−1 to grid i, i=1, . . . , N in a 1D data structure array, for example. The procedure is outlined as follows:

Let Ne be the maximum number of edges in 2D space (faces in 3D space) connecting a cell in grid i to the surrounding cells in grid i−1. For instance, Ne=14 in the example shown in FIG. 6. The edges can be numbered in any order. Therefore, for each cell k, there will be at most Ne corresponding transmissibilities with the surrounding cells. The transmissibilities corresponding to each cell are stored in a 1D array with Ne increments. Therefore, the first transmissibility in cell k will be indexed at location Ne*k+1 and the last one will be at index Ne*k+k.

Figure 6:
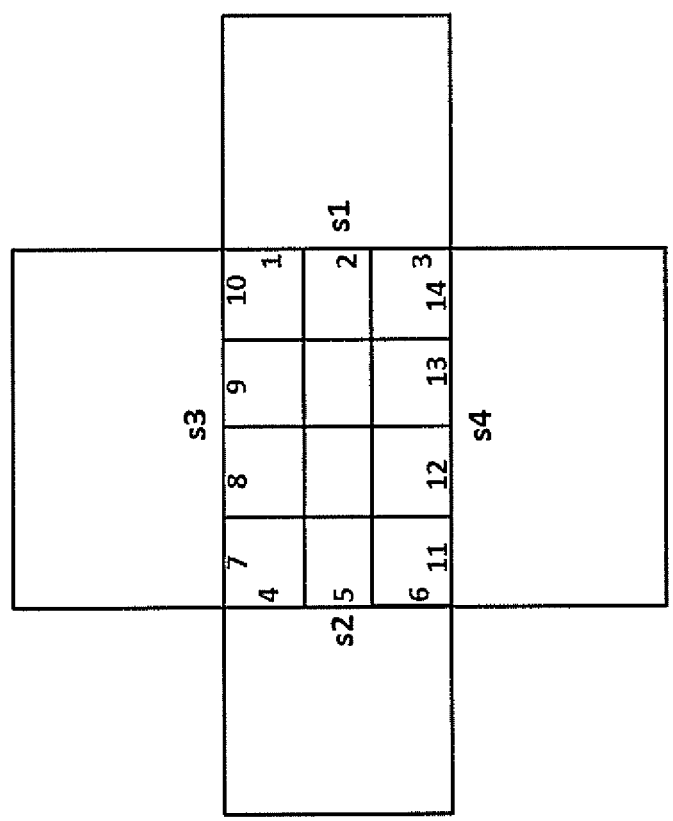
FIG. 6 illustrates connectivities for Ne=14 in an example grid.

Denote by s1, s2, . . . the cell sides corresponding to each cell k in the grid i−1, as appears in FIG. 6. Assign for each side the corresponding local indices of the edges. That is, $$s1 = \{1\ 2\ 3\}$$
$$s2 = \{4\ 5\ 6\}$$
$$s3 = \{7\ 8\ 9\ 10\}$$
$$s4 = \{11\ 12\ 13\ 14\}$$

Use the above table as a template to locate the non-neighboring transmissibilities between grid i−1 and grid i. For example, the non-neighboring transmissibilities across the right side s1 will be located at Ne*k+s1(1), Ne*k+s1(2), and Ne*k+s1(3).

Note that the example procedure above is defined in 2D space but the same logic is applicable in 3D space, as well.

Figure 7:
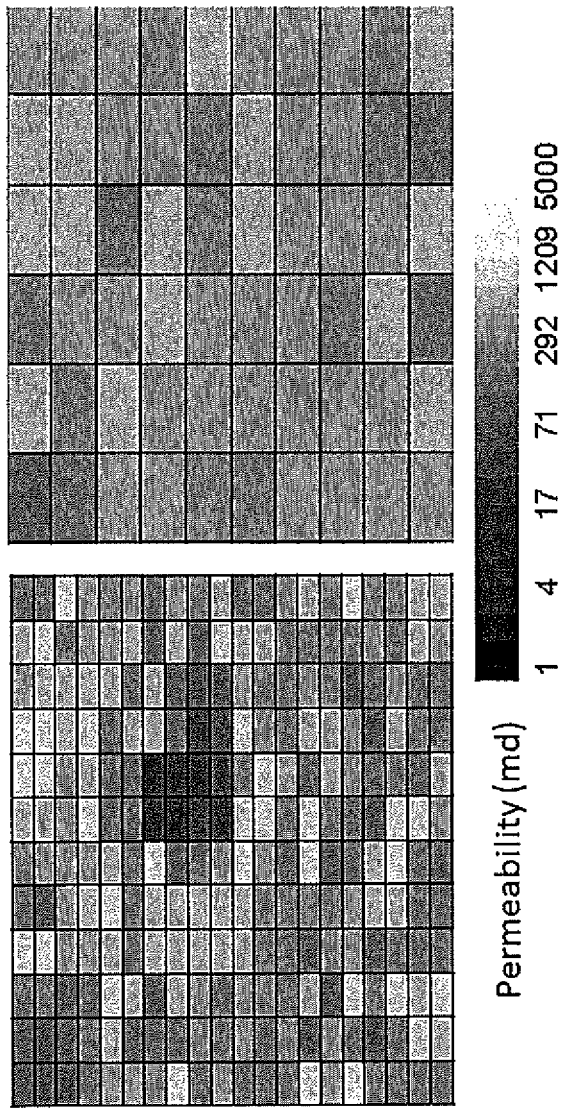
FIG. 7 shows an example case for two grid refinement levels with different geological properties assigned to equivalently positioned cells at different grid levels.

Geological Heterogeneity:

One of the challenges in dynamic gridding is in capturing geological heterogeneity, such as permeability and porosity, as these properties may vary in each refinement level. Up-scaling properties while coarsening the grid at run time is computationally inefficient. In embodiments, geological property up-scaling is not required. Nevertheless, the procedure is able to capture all geological heterogeneity in the fine grid. As discussed in the gridding strategy section, the refinement levels are seen as independent grids (see FIG. 2b). The geological properties for each grid can be provided as input by the user. The property maps can be generated by any upscaling tool. The properties corresponding to each grid can be used to pre-calculate the transmissibilities and store them in memory, as discussed previously. At the run time, if a grid refinement takes place then the transmissibilities for the fine grid will be used. If, otherwise, a grid coarsening takes place, the transmissibilities corresponding to the coarse grid will be used. Therefore, with this approach upscaling and downscaling are prevented at run time and the full geological heterogeneity is captured properly. FIG. 7 shows an example case for two grid refinement levels with different geological properties.

Figure 8:
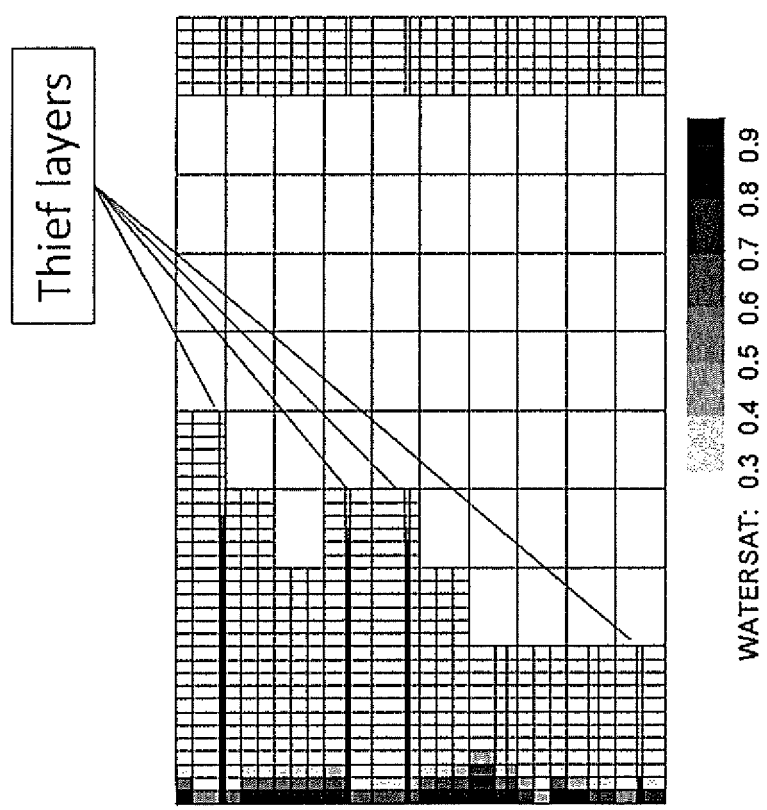
FIG. 8 shows an example case where non-uniform dynamic gridding is used to describe thief layers in a vertical domain.

Geological Structure:

In real applications non-uniform gridding is required to describe complex structures in a reservoir such as fractures and thief stratigraphic layers. The methods presented support uniform and non-uniform grids within the different refinement levels. This approach provides flexibility to capture complex structures with the fine grid even if the structure is not captured with the coarse grid. FIG. 8 shows an example case where non-uniform dynamic gridding is used to describe thief layers in a vertical domain at a given time step. Note that the coarse grid does not need to include the thief layers. As the grid gets refined, the structure properties will be picked up from the fine grid and therefore fine geological structure will appear.

Example Use:

Simulation models are used to maximize the net-present-value (NPV) from the hydrocarbon recovery and the development cost by selecting the recovery scheme, identifying the optimum number of wells and their locations, and predicting the production rates of oil, gas, and water. It can also be used to determine the future need for artificial lift and the size and type of the surface facilities. Improvement in simulation models is therefore crucial for more accurate investment decisions.

EXAMPLE

The following example is included to demonstrate specific embodiments of the disclosure. It should be appreciated by those of skill in the art that the techniques disclosed in the examples that follow represent techniques discovered by the inventors to function well in the practice of the invention, and thus, can be considered to constitute modes for its practice. However, those skilled in the art should, in light of the present disclosure, appreciate that many changes can be made in the specific examples disclosed and still obtain a like or similar result without departing from the scope of the invention.

Figure 9:
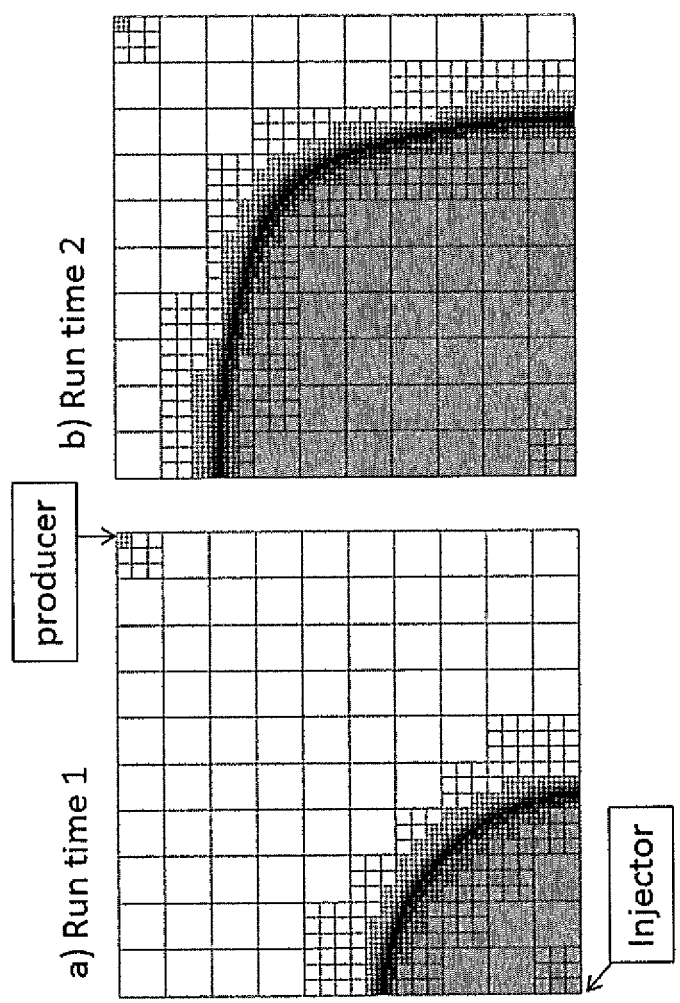
FIG. 9 shows the displacement front and the dynamic grids at two different times in an example simulation.
Figure 10:
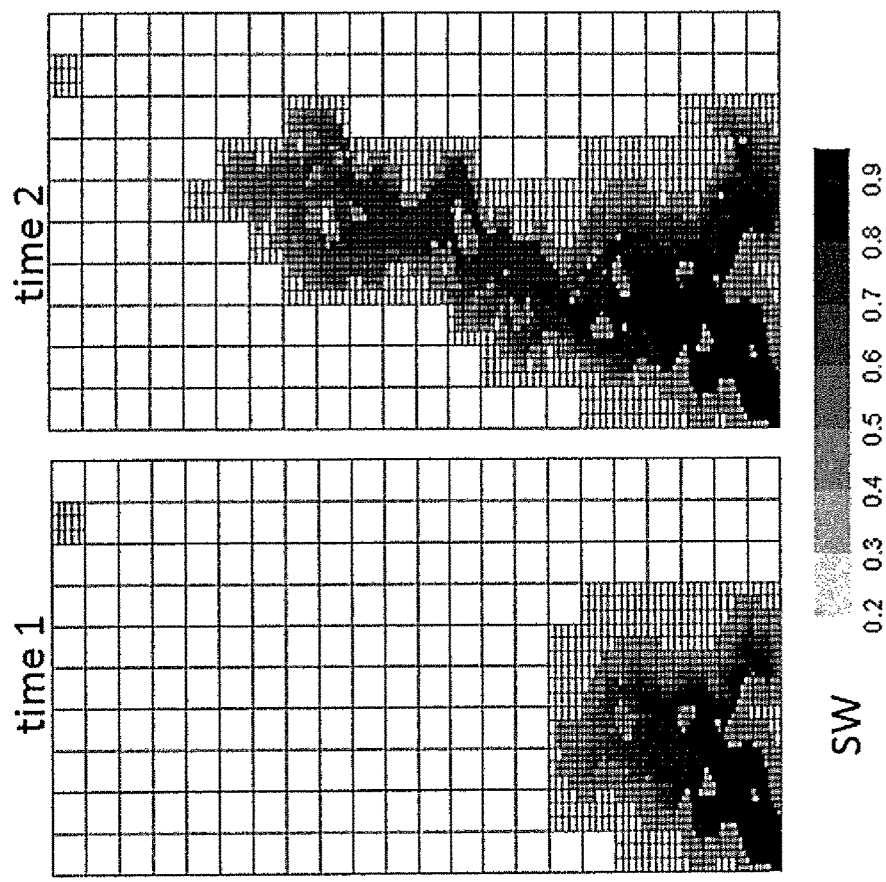
FIG. 10 shows the displacement front profiles at two simulation times in another example simulation.
Figure 11:
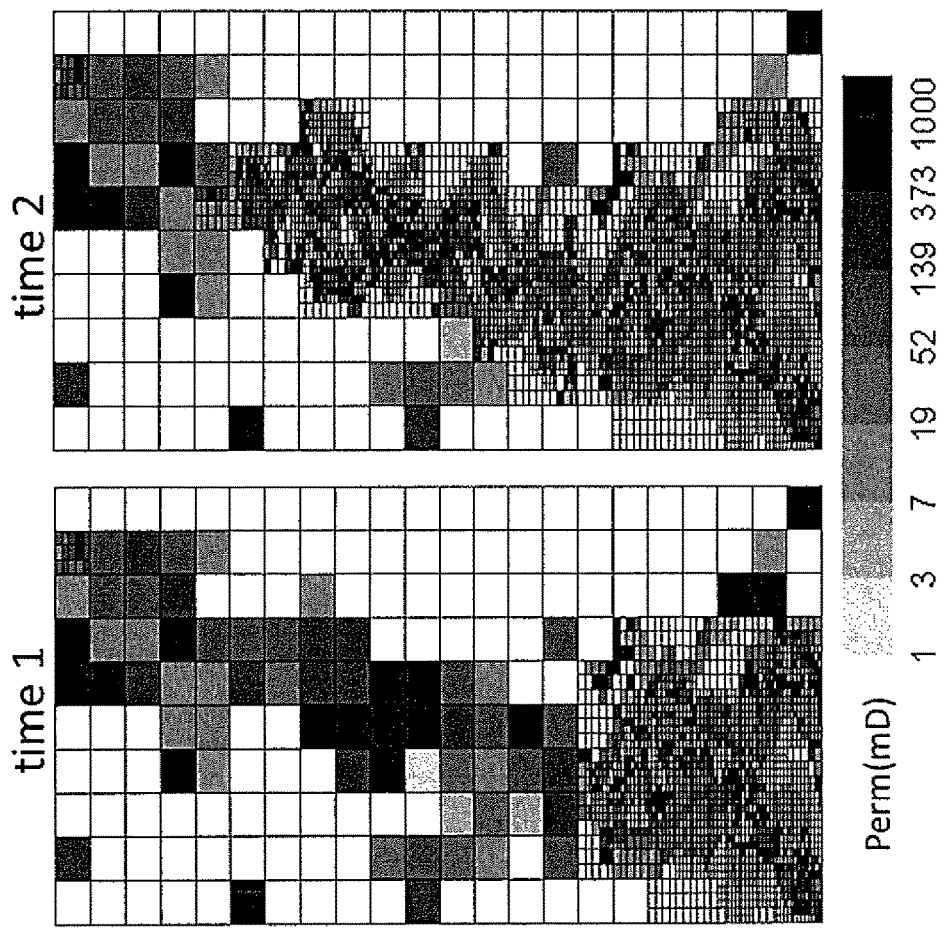
FIG. 11 demonstrates an example of how permeability maps can be updated as the grid changes.
Figure 12:
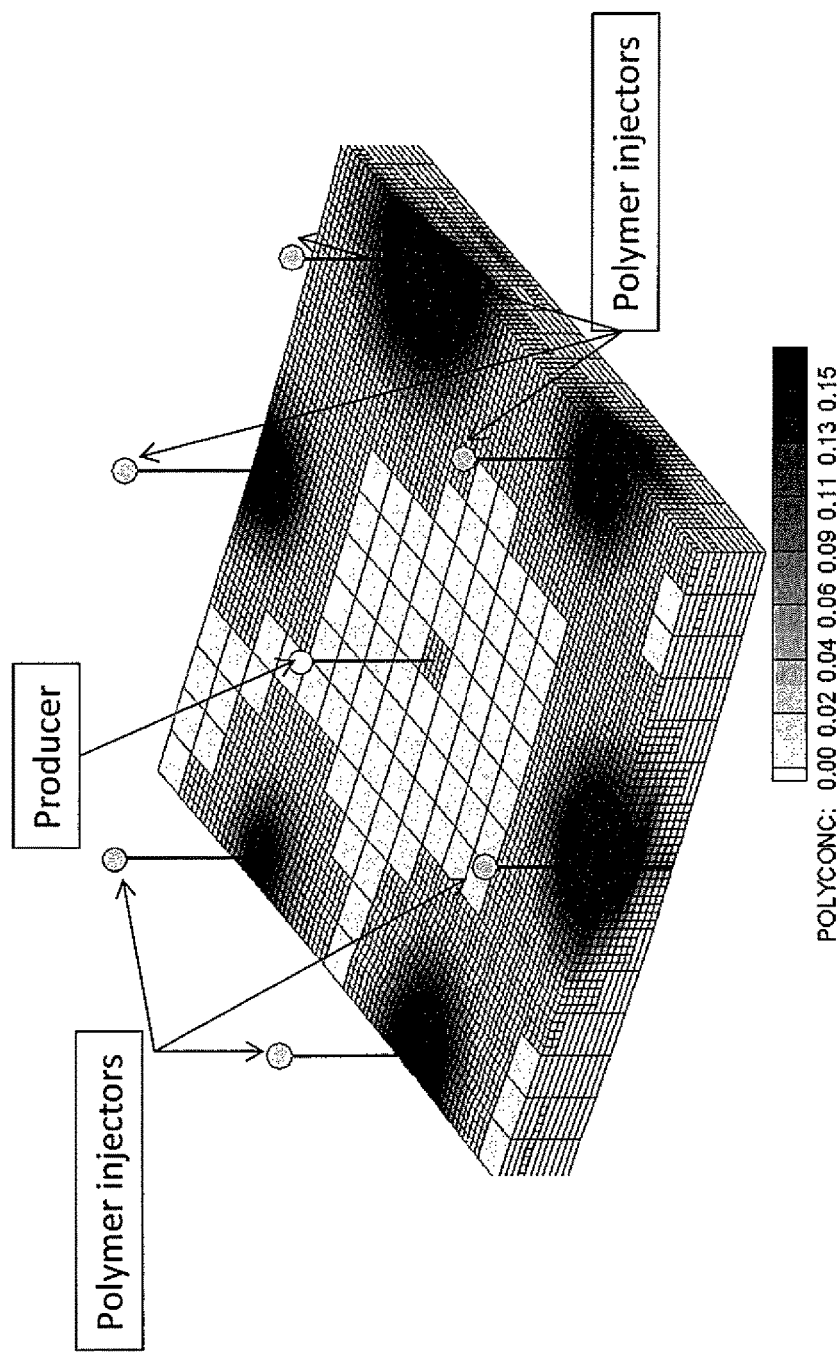
FIG. 12 shows a displacement polymer front and the dynamic gridding refinement in 3D space.
Figure 13:
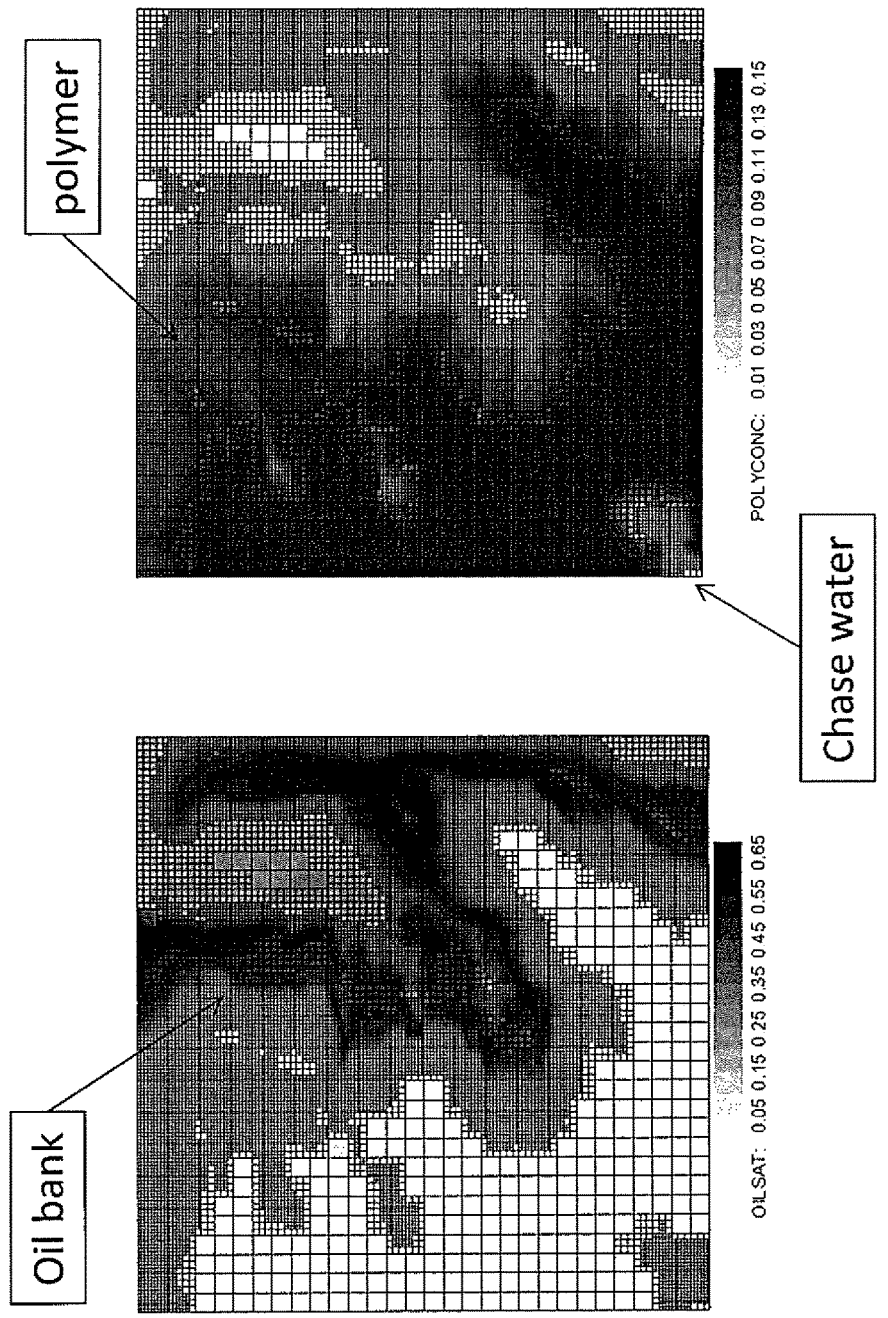
FIG. 13 demonstrates capabilities of the dynamic gridding method to track several fronts simultaneously which can occur at different locations in the domain.

Four test cases are described here to demonstrate embodiments of the method. In the first test case, a 2D domain was considered with one injector and one producer located at opposite corners. This case represents one quarter of a 5-spot pattern. In FIG. 9, the displacement front and the dynamic grid at two different time points are shown. The grid refinement is concentrated in the neighborhood of the displacement front. In the second case, a heterogeneous domain is considered with one injector and one producer. A 2-level grid refinement is applied. This model has three permeability maps corresponding to grids 0, 1, and 2. FIG. 10 shows the displacement front profiles at two simulation times for a channelized system. FIG. 11 demonstrates how the permeability maps are updated for the same channelized system as the grid changes. In the third case, a 3D heterogeneous reservoir model is considered. Polymer is injected in a 7-spot pattern. FIG. 12 shows the dynamic grid refinement in 3D space. In the final test case a surfactant-polymer flood case in a 2D heterogeneous domain with one injector and one producer was considered. A surfactant-polymer slug is injected first and then followed up by chase water. In this test case the capability of the DGF method to track several displacement fronts that may occur at different locations was demonstrated. FIG. 13 shows local refinements associated with the oil bank, polymer concentration, and chase water. The speed up obtained in the four test cases is 6×, 3.5×, 2.5× and 2×, respectively.

REFERENCES

All patents and publications mentioned in the specification are indicative of the levels of skill in the art to which the invention pertains. All patents and publication are herein incorporated by reference to the same extent as if each individual publication was specifically and individually indicated to be incorporated by reference.

M. A. Christie and M. J. Blunt. Tenth SPE comparative solution project: a comparison of upscaling techniques. SPE Reservoir Evaluation & Engineering, 4:308-317, 2001.

M. A. Christie. Upscaling for reservoir simulation. Journal of Petroleum Technology, 48:1004-1010, 1996.

L. J. Durlofsky, R. A. Behrens, R. C. Jones, and A. Bernath. Scale up of heterogeneous three dimensional reservoir descriptions. SPE Journal, 1:313 {326, 1996.

K. Aziz and A. Settari. Petroleum Reservoir Simulation. Applied Science Publishers, 1979".

US 20120179443 A1. Dynamic grid refinement

Ewing, R. E., U. of Wyoming; Lazarov, R. D., Adaptive Local Grid Refinement, ISBN 978-1-55563-582-4, SPE 17806, Ding, Yu, Lemonnier, P. A., Development of Dynamic Local Grid Refinement in Reservoir Simulation, ISBN 978-1-55563-493-3, SPE 25279

Peter H. Sammon, Dynamic Grid Refinement and Amalgamation for Compositional Simulation, ISBN 978-1-55563-968-6, SPE 79683

US 20120179443A1

What is claimed is:

1. A method for enhancing resource recovery in a subsurface reservoir comprising:
   (a) receiving, at a computer, a geological model of the subsurface reservoir;
   (b) defining a first grid having a first plurality of cells, wherein the first plurality of cells have heterogeneous rock properties;
   (c) defining a second grid having a second plurality of cells, wherein the second plurality of cells are finer than the first plurality of cells, and wherein the second plurality of cells have heterogeneous rock properties;
   (d) calculating connectivities and transmissibilities of neighboring cells in the first plurality of cells from the geological model, and storing the calculated connectivities and transmissibilities of the neighboring cells in the first plurality of cells in a database;
   (e) calculating connectivities and transmissibilities of neighboring cells in the second plurality of cells from the geological model, and storing the calculated connectivities and transmissibilities of the neighboring cells of the second plurality of cells in the database;
   (f) calculating connectivities and transmissibilities of connecting cells between the first plurality of cells and the second plurality of cells, and storing the calculated connectivities and transmissibilities of the connecting cells between the first plurality of cells and the second plurality of cells in the database;
   (g) performing a simulation of a fluid and/or gas flowing in the subsurface reservoir using dynamic grid refinement using a dynamic multilevel grid, wherein the dynamic multilevel grid is comprised of at least a portion of the first plurality of cells and at least a portion of the second plurality of cells and wherein the dynamic multilevel grid is updated dynamically such that the dynamic multilevel grid is refined at a displacement front of the fluid and/or gas flowing in the subsurface reservoir and wherein the connectivities and transmissibilities are updated during the simulation based on the calculated connectivities and transmissibilities that are stored in the database;
   (h) using the simulation to select one or more new wells and an associated location of each new well for recovering the resource from the subsurface reservoir;
   drilling each of the one or more new wells at the associated location from the simulation for recovering the resource from the subsurface reservoir; and
   (j) recovering the resource from the subsurface reservoir using the one or more new wells from the simulation.

2. The method of claim 1, wherein reservoir related input used for defining the first grid or the second grid comprises one or more of initial grid sizes, number of grids, rock model data, heterogeneity data for one or more grids, size of grid, displacement fluid and/or gas fronts to be tracked, thresholds, time step length, and total time.

3. The method of claim 1, further comprising defining one or more additional grids which overlay the first grid.

4. The method of claim 3, wherein the connecting cells connectivities and transmissibilities are calculated and stored in the database between all grids.

5. The method of claim 1, wherein the dynamic multilevel grid is a Cartesian, perpendicular bisector, or corner-point-geometry grid.

6. The method of claim 1, wherein each cell is assigned a parameter including one or more of porosity, permeability, saturation, composition and pressure.

7. The method of claim 1, wherein the simulated fluid and/or gas comprises one or more of water, a surfactant, $CO_2$, steam, and polymer.

8. The method of claim 1, wherein a cell from the first grid has different rock properties from an equivalently positioned cell or cells of the second grid.

9. The method of claim 1, wherein simulating the fluid and/or gas includes simulating sequential injection of different types of fluid and/or gas into the reservoir.

10. The method of claim 9, wherein the finer of the two grids is used at intersections between different types of fluid and/or gas.

11. The method of claim 1, wherein grid cells which are active when simulating a fluid and/or gas flowing in the reservoir are consecutively numbered.

12. The method of claim 1, further comprising predicting production rates of one or more of oil, gas, and water.

13. The method of claim 1, further comprising tracking one or more gas or liquid fronts.

14. The method of claim 13, wherein tracking the front comprises tracking saturation and/or composition.

15. The method of claim 1, wherein the connectivities and the transmissibilities are calculated based on the heterogeneous rock properties of each cell.

16. The method of claim 1, wherein the dynamic multilevel grid is updated dynamically such that the dynamic multilevel grid is coarsened behind the displacement front of the fluid and/or gas flowing in the subsurface reservoir.

* * * * *